Nov. 7, 1933.  T. BOWLER  1,934,255
VALVE
Filed Aug. 20, 1931
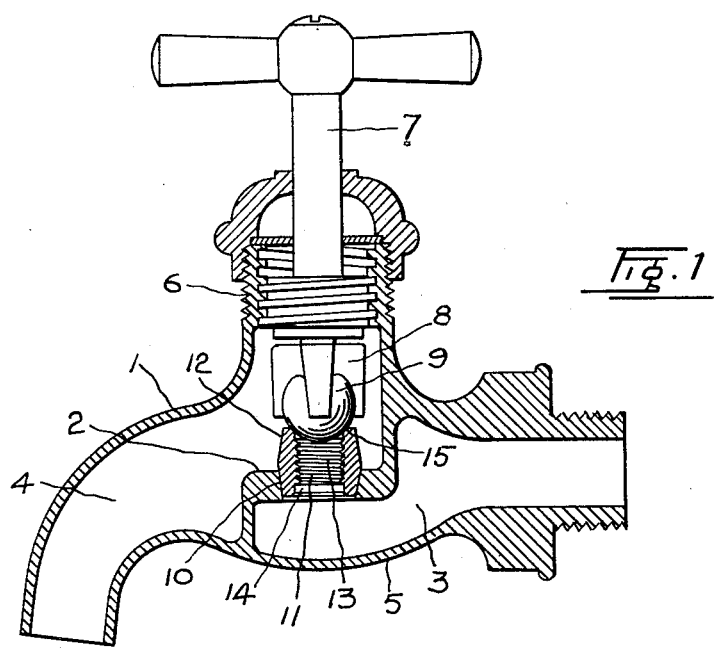
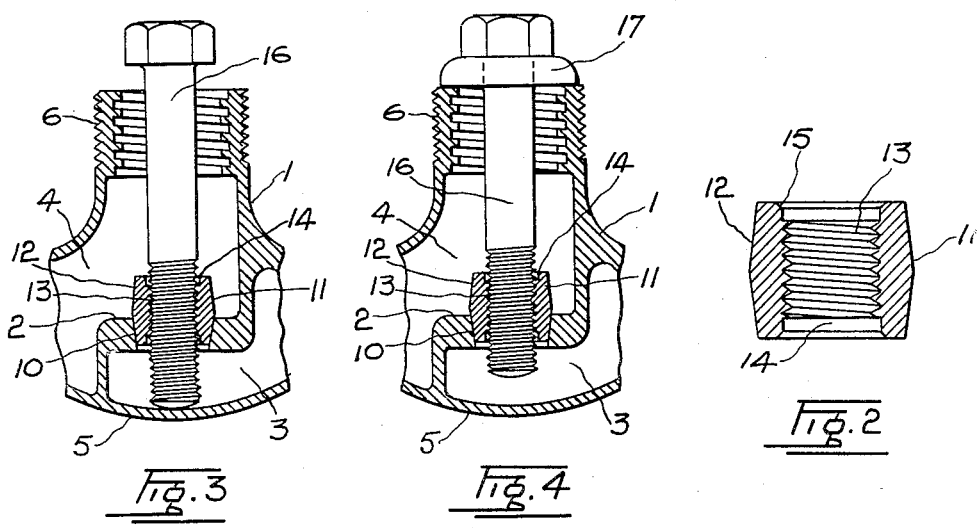
INVENTOR
THOMAS BOWLER
ATTORNEYS Patented Nov. 7, 1933

1,934,255

UNITED STATES PATENT OFFICE 1,934,255

VALVE

Thomas Bowler, North Vancouver, British Columbia, Canada

Application August 20, 1931. Serial No. 558,349

2 Claims. (Cl. 251—167)

My invention relates to improvements in valves. The objects of the present invention are to provide a valve having a seat capable of being secured in position within the valve body by the simple expedient of screwing down the valve closure upon it and of being removed at will with the use of a bolt and wrench; and of producing a valve which is capable of holding against any desired pressure without leakage, so as to reduce to a minimum seat renewals or valve grinding. A further object is to provide a construction whereby a ball valve closure can be embodied into a valve without having recourse to enlarging the body beyond that normally provided in the usual washer type of valve, so that such valves can be changed to the ball type with a minimum expense if so desired.

The invention consists essentially of a valve body having an apertured dividing wall and an internally threaded seat member having a conical exterior adapted to be pressed into the aperture of the dividing wall, as will be more fully described in the following specification and shown in the accompanying drawing, in which:—

Fig. 1 is a sectional view of the invention.

Fig. 2 is a detail sectional view of the valve seat.

Fig. 3 is a sectional view showing one method of removing the seat from the valve.

Fig. 4 is a sectional view showing another method of removing the seat from the valve.

In the drawing like characters of reference indicate corresponding parts in each figure.

The numeral 1 indicates a valve body having a dividing wall 2 separating the inlet compartment 3 from the outlet compartment 4. The inlet compartment 3 is provided in the usual way with a bottom wall 5 and similarly the outlet compartment 4 is provided with an internally threaded neck 6 in which is supported a valve stem 7 having at its lower end a claw 8 loosely retaining a ball closure 9.

The dividing wall 2 is provided with a tapered aperture 10 which is concentric with the stem 7 and in this aperture a valve seat 11 is inserted. The valve seat 11 is a tubular member having upper and lower external conical portions 12 either of which are capable of coacting with the tapered aperture 10 to make a fluid tight joint, the taper being relatively acute or such as to securely hold the valve seat in place after being pressed into position yet to permit of a slight disalignment between the axis of the seat and the axis of the aperture. The medial portion of the seat is internally threaded as at 13, defining an annular recess 14 both above and below the thread. The upper and lower extremities of the seat 11 are internally bevelled as at 15 to coincide substantially with the contour of the closure 9.

When assembling the valve a seat 11 is loosely placed in position within the conical aperture 10 and the valve stem 7 screwed down until its closure 9 contacts with the valve seat 11 and forces it into position.

If the valve stem is slightly bent or any other defect is present to cause the ball closure 9 to be out of alignment with the aperture 10 of the dividing wall 2, the final downward movement of the closure will force the seat into a position where its vertical axis is at an angle to the vertical axis of the aperture, but the inner periphery or the upper bevel 15 of the valve seat will be set in a position concentric with the ball when at its point of ultimate closure so that the valve when closed will be fluid tight and the slightest raising of the ball closure will clear the seat as required. Obviously as soon as the closure is lifted the pressure in the inlet compartment will be relieved so that there is no tendency for said pressure to displace the seat from the aperture in the dividing wall.

If the valve seat should become worn at one end and it becomes necessary to reverse it so that the other bevelled portion 15 may be used to coact with the closure, the seat can be easily removed by inserting a bolt 16 through the seat and turning it until its free end bears upon the bottom wall 5, see Figure 3, when a further slight turn will force the seat upwards out of the aperture 10. Alternately a washer 17 may be placed to cover the neck 6 of the valve body and the bolt passed through it and the seat, as shown in Figure 4, when a slight turn of the bolt will displace the seat which can then be withdrawn anid reversed or another one inserted in its place.

What I claim as my invention is:

1. In a valve having an apertured dividing wall, a valve stem and a ball closure thereon, an annular seat member tapered externally to a smaller diameter at its upper and lower extremities than at its vertical centre, said seat member having a recess at each end and an internal thread connecting the bases of the recesses.

2. In a valve having an apertured dividing wall, a valve stem and a ball closure thereon, an annular seat member tapered externally to a smaller diameter at its lower extremity, said seat member having a recess at its upper extremity and an internal thread extending from the base of the recess downwardly through the member.

THOMAS BOWLER.